US010628869B2

(12) United States Patent
Braxton

(10) Patent No.: US 10,628,869 B2
(45) Date of Patent: Apr. 21, 2020

(54) SYSTEM AND METHOD FOR REAL-TIME VIDEO PROCESSING TO FIND AND DISPLAY RELATED SOCIAL CONTENT, RELATED VIDEOS, AND RELATED IMAGES

(71) Applicant: Jamie Daniel Braxton, Southfield, MI (US)

(72) Inventor: Jamie Daniel Braxton, Southfield, MI (US)

( * ) Notice: Subject to any disclaimer, the term of this patent is extended or adjusted under 35 U.S.C. 154(b) by 46 days.

(21) Appl. No.: 15/785,532

(22) Filed: Oct. 17, 2017

(65) Prior Publication Data

US 2018/0108064 A1  Apr. 19, 2018

Related U.S. Application Data

(60) Provisional application No. 62/409,113, filed on Oct. 17, 2016.

(51) Int. Cl.
  *G06K 9/00* (2006.01)
  *G06Q 30/06* (2012.01)
  *G06K 9/68* (2006.01)
  *G06T 7/70* (2017.01)

(52) U.S. Cl.
  CPC ..... *G06Q 30/0623* (2013.01); *G06K 9/00671* (2013.01); *G06K 9/6878* (2013.01); *G06T 7/70* (2017.01); *G06K 2209/01* (2013.01)

(58) Field of Classification Search
  None
  See application file for complete search history.

(56) References Cited

U.S. PATENT DOCUMENTS

| 2006/0012677 | A1 | 1/2006 | Neven, Sr. et al. | |
|---|---|---|---|---|
| 2007/0025723 | A1* | 2/2007 | Baudisch | G03B 13/02 396/287 |
| 2015/0221118 | A1 | 8/2015 | Shaburova | |
| 2016/0203641 | A1* | 7/2016 | Bostick | G02B 27/0172 345/633 |
| 2017/0116786 | A1* | 4/2017 | Ramkumar | G06F 15/16 |
| 2017/0155850 | A1 | 6/2017 | Ko et al. | |

OTHER PUBLICATIONS

Home. (n.d.). Retrieved Oct. 17, 2017, from http://slyce.it/.
(n.d.). Retrieved Oct. 17, 2017, from https://www.abbyy.com/en-us/real-time-recognition-sdk/.

* cited by examiner

*Primary Examiner* — Delomia L Gilliard
(74) *Attorney, Agent, or Firm* — Dunlap Bennett & Ludwig PLLC; Brendan E. Squire

(57) ABSTRACT

A method for real-time video processing to find and display independent content, such as related social media content, related videos, and related images for an object or services, to facilitate purchasing decisions for an object or services. The system and method allows a user to utilize a camera of a computing device to scan an object or text associated with a product or service, in real time, to find related social content, related videos, and related images pertaining to the object and presents the independent content on a user interface for review by the user.

16 Claims, 2 Drawing Sheets

SYSTEM AND METHOD FOR REAL-TIME VIDEO PROCESSING TO FIND AND DISPLAY RELATED SOCIAL CONTENT, RELATED VIDEOS, AND RELATED IMAGES

CROSS-REFERENCE TO RELATED APPLICATION

This application claims the benefit of priority of U.S. provisional application No. 62/409,113, filed Oct. 17, 2016, the contents of which are herein incorporated by reference.

BACKGROUND OF THE INVENTION

The present invention relates to purchasing, and more particularly to systems and methods for a buyer or potential user to gain an understanding of a product before making a purchase of an item or service or using a product or service.

Buyer's remorse is a phenomenon where a purchaser may become dissatisfied or disappointed with a product or service they have purchased. Similarly, at the pre-purchase stage, buyers may be reluctant to close a transaction due to uncertainty of using an item or incomplete information regarding the item or service. In this instance consumers want to achieve a greater understanding and have peace of mind about using a product or service.

Current methods for obtaining result to offset the pre-purchase information deficit include typing request, speaking request, scanning bar codes, and capturing an image of the product. There is currently no system or method that allows users to use real time footage to find social content, related videos, related images, reviews, and other sources of data related to ascertain information about an item that is presently in the camera lens' view.

As can be seen, there is a need for a system and method that allows a user to utilize a portable device camera to scan an object or characters in real time to locate related social media content, related videos, related images, external reviews (from sites such as Yelp!), and optionally other related sources (such as Google) pertaining to the item currently captured by the camera lens view.

SUMMARY OF THE INVENTION

In one aspect of the present invention, a computerized system for filling an information deficit pertaining to an article is disclosed. The system includes a computer having a user interface; and a program product comprising machine-readable program code for causing, when executed, the computer to perform the process steps. The process steps include obtaining real time image data for an article that is presently in a field of view of a camera lens of a camera (without capturing an image) operatively connected with the computer. Analyzing the real time image data for a distinguishing characteristic. If the distinguishing characteristic is found, transmitting the distinguishing characteristic to a server in communication with the computer. If the distinguishing characteristic is not found; repeating the step of obtaining the real time image data of the article. The distinguishing characteristic includes one or more characteristics of an object appearance, and one or more characters.

The steps may include receiving independent content pertaining to the article based upon a matching of the distinguishing characteristic with an identification of the article contained in an identified items database. The independent content is identified in one or more of a social media network, a video repository, or an image gallery, reviews, and other sources of data related to ascertain information. Other steps may include presenting the independent content on the computer.

Other aspects of the invention include a computerized system for filling an information deficit pertaining to an article. The system includes a server configured for communication with a computer operatively connected to a camera; and a program product comprising machine-readable program code for causing, when executed, the server to perform process steps. The steps include receiving a distinguishing characteristic pertaining to the article, wherein the distinguishing characteristic is obtained from real time image data that is presently in a field of view of the camera lens. The distinguishing characteristic is matched with an identification of the article contained in an identified items database in communication with the server. If the distinguishing characteristic matches the identification of the article a search for independent content pertaining to the identified article is performed on a social media network, a video repository, an image gallery, reviews, and information pertaining to the article. The independent content or a link to the independent content may then be transmitted to the computer.

Yet other aspects of the invention include a non-transitory computer-readable memory adapted to filling an information deficit pertaining to an article. The non-transitory computer-readable memory used to direct a computer to perform the steps of obtaining real time image data that is presently in the camera lens' view (without capturing an image) for an article from a camera operatively connected with the computer; and analyzing the real time image data for a distinguishing characteristic. If the distinguishing characteristic is found, the distinguishing characteristic is transmitted to a server in communication with the computer. If the distinguishing characteristic is not found; repeating the step of obtaining the real time image data of the article. The distinguishing characteristic includes one or more of an object appearance, and one or more characters.

Independent content pertaining to the article based upon a matching of the distinguishing characteristic with an identification of the article contained in an identified items database is received by the computer. The independent content is identified in one or more of a social media network, a video repository, an image gallery, reviews, and other information data pertaining to the article and is presented on the computer. The independent content may be a link.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provide a system, method, and apparatus for remediating a user's 10 pre-purchase information deficit pertaining to an article or service by real-time analysis of objects and characters for information relating to the items captured in a field of view of a camera 12 on a portable computing device.

As stated above, buyer's remorse and uncertainty of using a product or an item present problems for consumers. Consumers want to understand and have peace of mind about using a product before buying/using the product. The system and method of the present invention facilitates commerce transactions by educating consumers about a product before they use or purchase the product. By allowing a user to use a portable device camera to scan an item in real time to find related videos, related images, related social content, external information from reviews sites (such as Yelp!), and optionally other details from external sites (such as Google) relating to the product or service, the system fills or partially fills a buyer's information deficit on a product or service, allowing a user to make a better decision before buying/using an item.

Current systems require a user to capture an image, scan a bar code, or type in requests, which take the consumer to hosted product advertising pages for a product. By contrast, a system according to aspects of the invention permits consumers to receive and view opinions, tutorials, reviews, and other important pieces of information outside of the content that is available on hosted product advertising pages that are under the business' or seller's control. In short, current methods only show you store results, not what people outside of the stores have to say about the product.

A system according to aspects of the invention are shown in reference to.

Figure 1:
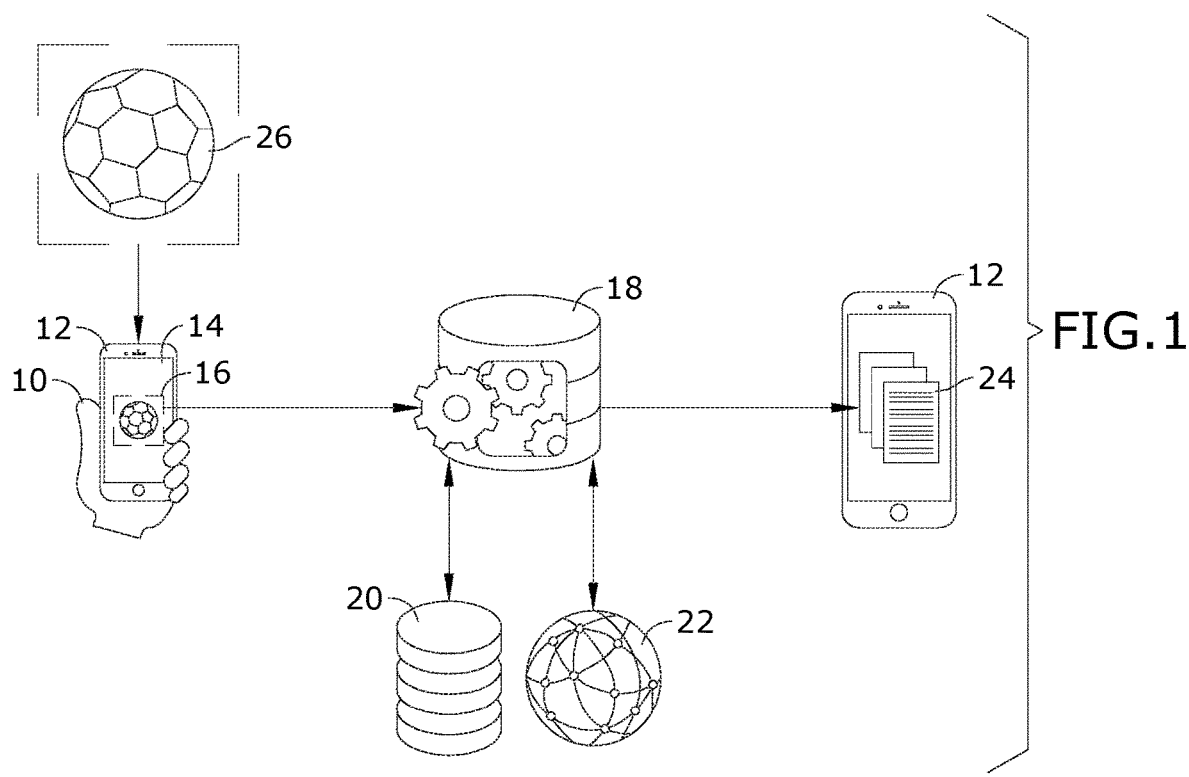
FIG. 1 is a schematic view of the object scanning system according to aspects of the invention.
Figure 2:
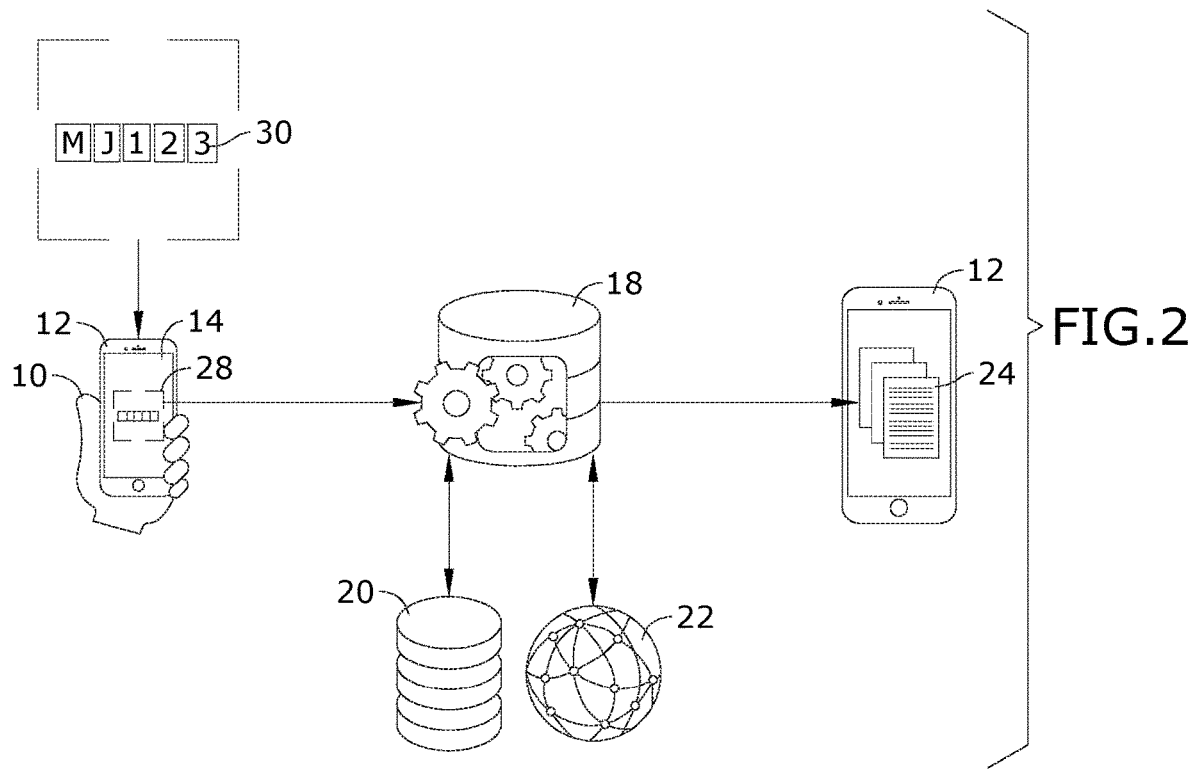
FIG. 2 is a schematic view of a character scanning system according to aspects of the invention.

FIGS. 1 and 2. The system allows a user 10 to utilize a camera equipped computing device 12 to scan the object 26 or characters 30 associated a product or service in real time to locate related social content, related videos, related images, external information from reviews sites (such as Yelp!), and optionally other details from sites (such as Google) pertaining to the article or service. The computing device 12 is in communication with a server 18 configured to host the system. The server 18 is in communication with an identified item database 20 that is configured to match an identification characteristic 16, 28 of the object 26 or characters 30 received from the computing device 12 with an identified product or service maintained in the identified item database 20.

The server 18 is also configured to query a computer network to locate independent content, such as related social content, related videos, related images, external information from reviews sites (such as Yelp!), and optionally other details from sites (such as Google) that is associated with the identified product or service. The server 18 communicates the independent content 24, or links to the independent content, to the computing device 12 where it may be displayed on the UI 14 for the user 10 to review before purchasing or using the product or service.

Figure 3:
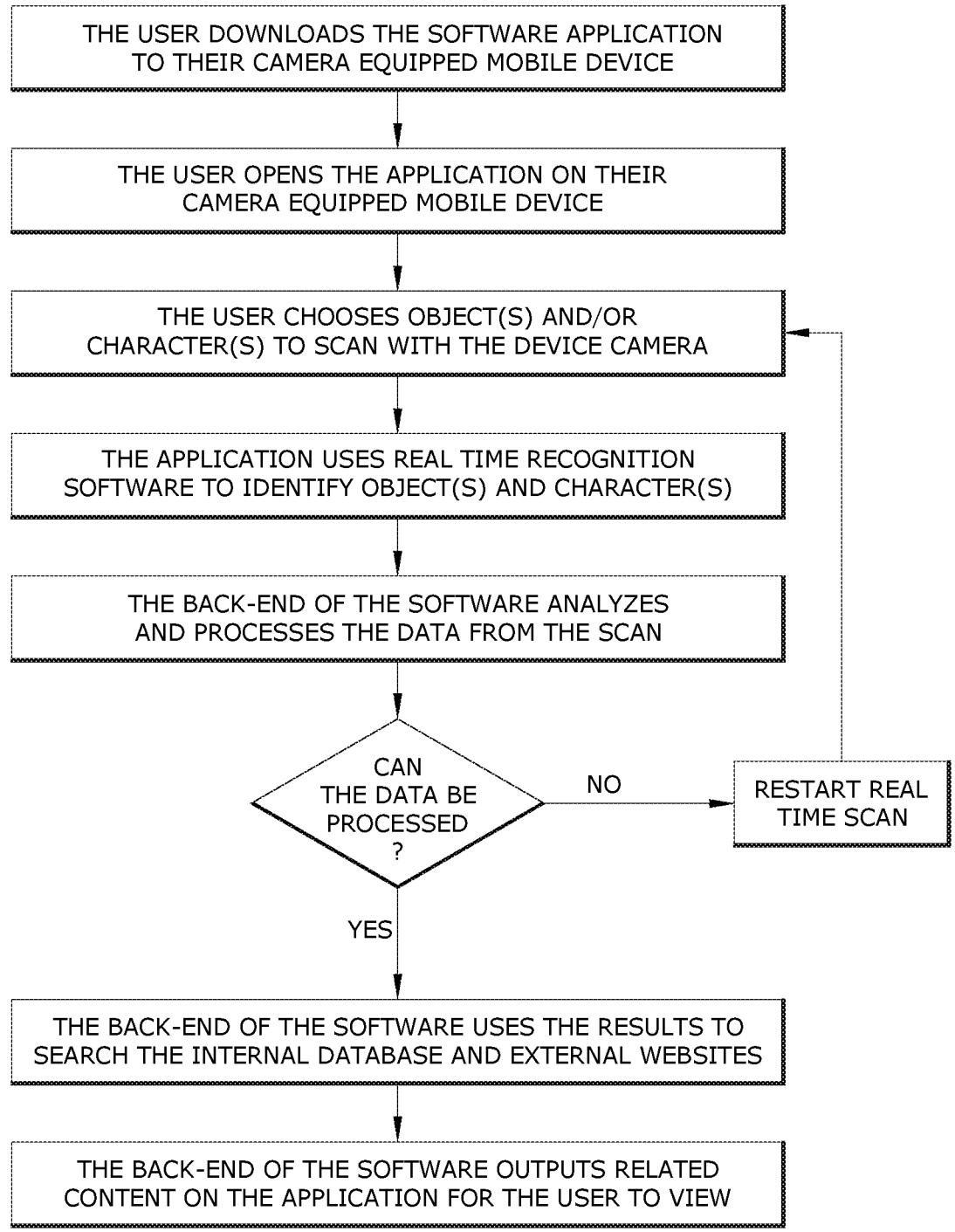
FIG. 3 is a flow chart of the a method according to aspects of the invention.

A method according to aspects of the current invention is illustrated in reference to FIG. 3. The method may include installing a computer program product application on a computing device 12. The computing device 12 is provisioned with a camera and a network communication connection, such as a cellular or Wi-Fi network. The application is provisioned with a user interface UI 14 that allows the user 10 to utilize the device camera 12 to scan an object of interest 26 or characters associated with the object of interest 30 with a real-time video.

The application determines a characteristic of at least one area of an object 26 or characters 30 as an distinguishing characteristic 16 to assist in identify the object 26 or characters associated with the object of interest 30. As seen in reference to FIG. 1, for the system to scan objects, it uses real time object recognition technology to identify at least one element of the article's shape that can be used to match to at least one element of shapes and objects in the identified item database 20. The distinguishing characteristic is communicated to the system server 18. The server 18 then queries the identified item database 20 to identify the object 26 based on the distinguishing characteristic 16, 28 of the object(s) 26 or characters 30 associated with the object.

As seen in reference to FIG. 2, for the system to scan characters, uses real time character recognition technology to identify the character(s), and letter/numeric/symbol shapes to identify at least one distinguishing characteristic 28 of the character(s) 30 that can be used to match to character(s) in the identified item database 20.

If the application server 18 determines an identification of the object 26 or characters 20 associated with an item or service, based on the least one distinguishing characteristic 16, 28, the server 18 queries the identified item database 20 and/or external websites 22 for independent source content relating to the identified object. The independent source content may include one or more of social media content, related videos, related images, external information from reviews sites (such as Yelp!), and optionally other details from sites (such as Google).

Upon locating independent source content, the system server 18 outputs the independent source content related social content, related videos, related images, external information from reviews sites (such as Yelp!), and optionally other details from sites (such as Google) from database or external websites associated with identified object or characters on software of portable device. The independent source content is found on the server 18 communicates the independent content 24 which may include links to the independent content 24 to the computing device 10, which is then displayed on the UI 14 portable device for the user 10 to view.

A user can download the application onto their portable device 12 to scan objects 26 and characters 30 in any situation that requires the user 10 to understand and learn more about an item. The application is configured to help the user 10 to find social content, instructional/how-to/tutorial videos, video reviews, videos of items in use, image reviews, images of the item in use, written reviews, and more. This can help the user 10 make a more educated decision by knowing more about the item in question.

Additionally, the real time scan software can be applied to devices with cameras in the medical field, education field, real estate, health and fitness, fashion industry, food industry, automotive industry, beauty and cosmetics industry, airline industry, financial industry, entertainment industry, and business.

The system of the present invention may include at least one computer 12 with a user interface 14. The computer 12 may include any computer including, but not limited to, a desktop, laptop, and smart device, such as, a tablet and smart phone. The computer 12 includes a program product including a non-transitory machine-readable program code for causing, when executed, the computer to perform steps. The program product may include software which may either be loaded onto the computer 12 or accessed by the computer 12. The loaded software may include an application on a smart device. The software may be accessed by the computer 12 using a web browser. The computer 12 may access the software via the web browser using the internet, extranet, intranet, host server, internet cloud and the like.

The computer-based data processing system and method described above is for purposes of example only, and may be implemented in any type of computer system, or programming, or processing environment, or in a computer program, alone or in conjunction with hardware. The present invention may also be implemented in software stored on a non-transitory computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer.

It is further contemplated that the present invention may be run on a stand-alone computer system 12, or may be run from a server computer system 18 that can be accessed by a plurality of client computer systems 12 interconnected over an intranet network, or that is accessible to clients over the Internet. In addition, many embodiments of the present invention have application to a wide range of industries. To the extent the present application discloses a system, the method implemented by that system, as well as software stored on a non-transitory computer-readable medium and executed as a computer program to perform the method on a general purpose or special purpose computer, are within the scope of the present invention. Further, to the extent the present application discloses a method, a system of apparatuses configured to implement the method are within the scope of the present invention.

What is claimed is:

1. A computerized system for filling an information deficit pertaining to an article, comprising:
   a computer having a user interface; and
      a program product comprising machine-readable program code for causing, when executed, the computer to perform the following process steps:
      obtaining real time image data of the article from a camera operatively connected with the computer; and
      analyzing the real time image data that is presently in a viewing field of the camera without capturing an image to determine a distinguishing characteristic of the article;
      if the distinguishing characteristic is found, transmitting the distinguishing characteristic to a server in communication with the computer;
      matching the distinguishing characteristic with an identified article contained in an identified items database; and
      searching one or more external web sites for an independent content corresponding to the identified article.

2. The computerized system of claim 1, further comprising:
   if the distinguishing characteristic is not found; repeating the step of obtaining the real time image data of the article that is presently in the viewing field of the camera lens without capturing an image.

3. The computerized system of claim 1, wherein the distinguishing characteristic comprises of elements of one or more of an object appearance, and one or more characters.

4. The computerized system of claim 3, further comprising:
   receiving the independent content pertaining to the identified article based upon a matching of the distinguishing characteristic with the identification of the article contained in the identified items database.

5. The computerized system of claim 4, wherein the independent content is identified in one or more of a social media network, a video repository, an image gallery, reviews, and information related to the article.

6. The computerized system of claim 4, further comprising:
   presenting the independent content on the computer.

7. A computerized system for filling an information deficit pertaining to an article, comprising:
   a server configured for communication with a computer operatively connected to a camera; and
   a program product comprising machine-readable program code for causing, when executed, the server to perform the following process steps:
   receiving a distinguishing characteristic pertaining to the article, wherein the distinguishing characteristic is obtained from real time image data of the article that is presently in a field of view of the camera lens without capturing an image;
   matching the distinguishing characteristic with an identified article contained in an identified items database in communication with the server; and
   searching for independent content pertaining to the identified article on a social media network, a video repository, an image gallery, a review, and a data source pertaining to the identified article.

8. The computerized system of claim 7, further comprising:
   transmitting a link to the independent content to the computer.

9. The computerized system of claim 7, further comprising:
   transmitting the independent content to the computer.

10. A non-transitory computer-readable memory adapted filling an information deficit pertaining to an article, the non-transitory computer-readable memory used to direct a computer to perform the steps of:
    obtaining real time image data without capturing an image of the article that is presently in a viewing field of a camera lens operatively connected with the computer to determine a distinguishing characteristic of the article from; and
    analyzing the real time image data for a distinguishing characteristic;
       if the distinguishing characteristic is found, transmitting the distinguishing characteristic to a server in communication with the computer:
       matching the distinguishing characteristic with an identified article contained in an identified items database; and
       searching one or more external web sites for an independent content corresponding to the identified article.

11. The non-transitory computer-readable memory of claim 10, further comprising:
    if the distinguishing characteristic is not found; repeating the step of obtaining the real time image data of the article.

12. The non-transitory computer-readable memory of claim 10, wherein the distinguishing characteristic comprises one or more of an object appearance, and one or more characters.

13. The non-transitory computer-readable memory of claim 12, further comprising:
receiving independent content pertaining to the identified article based upon a matching of the distinguishing characteristic with the identification of the article contained in the identified items database.

14. The non-transitory computer-readable memory of claim 13, wherein the independent content is identified in one or more of a social media network, a video repository, an image gallery, reviews, and other sources of data related to ascertain information.

15. The non-transitory computer-readable memory of claim 14, further comprising:
presenting the independent content on the computer.

16. The non-transitory computer-readable memory of claim 15, wherein the independent content comprises a link.

* * * * *